United States Patent [19]

Boutell et al.

[11] 4,137,824
[45] Feb. 6, 1979

[54] REMOTE SHIFTER FOR VEHICLE TRANSMISSIONS

[75] Inventors: Richard G. Boutell, Danville, Ky.; Carroll M. Grigsby, Raleigh, N.C.

[73] Assignee: Scovill Manufacturing Company, Waterbury, Conn.

[21] Appl. No.: 763,978

[22] Filed: Jan. 31, 1977

[51] Int. Cl.² .................. F01B 31/12; F15B 13/16
[52] U.S. Cl. ............................... 91/1; 91/362; 92/138; 92/142
[58] Field of Search ...................... 91/362, 1

[56] References Cited

U.S. PATENT DOCUMENTS

| 1,308,089 | 7/1919 | Mordis | 91/362 |
| 1,851,902 | 3/1932 | Haeghen | 91/362 |
| 1,913,910 | 6/1933 | Altmayer | 91/362 |
| 2,106,474 | 1/1938 | Baughman | 91/362 |

Primary Examiner—Paul E. Maslousky
Attorney, Agent, or Firm—Dallett Hoopes

[57] ABSTRACT

Primary switches in bus cab, for instance, activate contacts in secondary switch group in rear transmission compartment to energize solenoids selectively pressurizing opposed cylinders to drive transmission shift operation to various positions.

5 Claims, 4 Drawing Figures

U.S. Patent  Feb. 6, 1979  Sheet 1 of 2  4,137,824
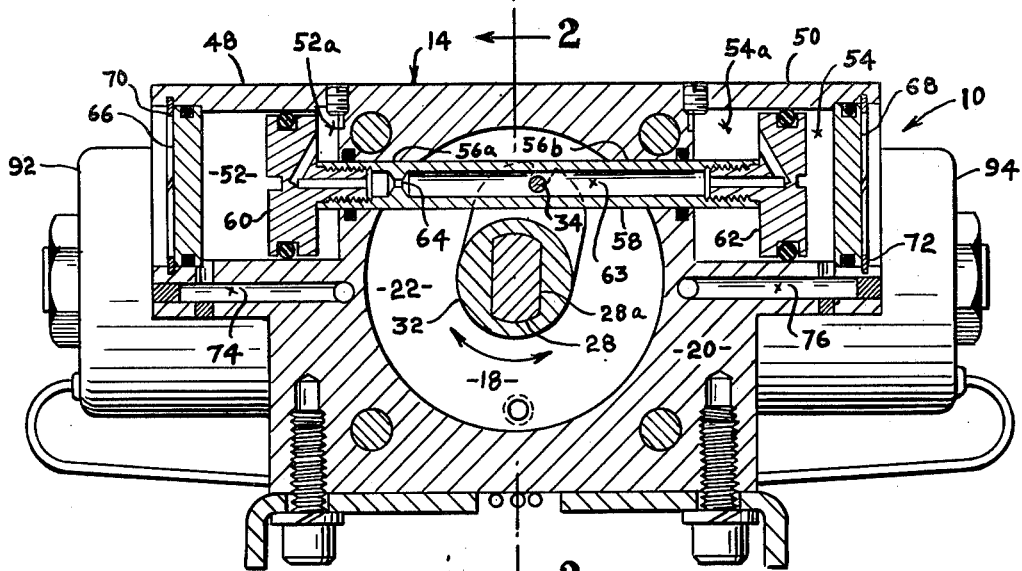
Fig. 1.
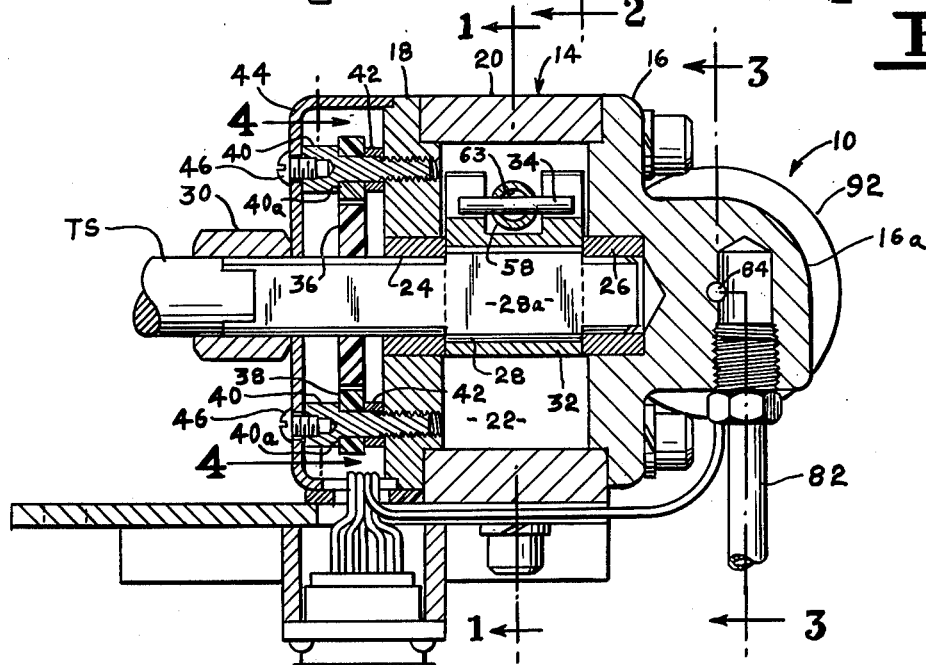
Fig. 2.
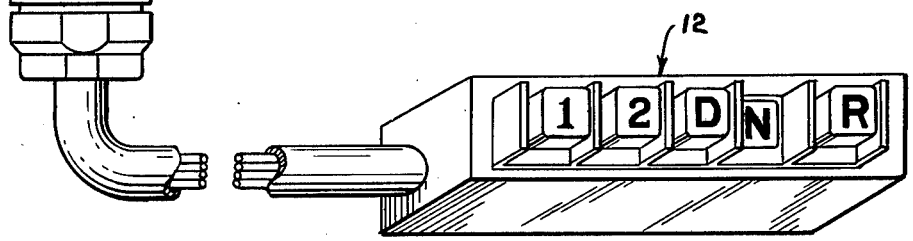

REMOTE SHIFTER FOR VEHICLE TRANSMISSIONS

BACKGROUND OF THE INVENTION

1. Field of the Invention

This invention relates to a remote shifting device for vehicle transmissions whereby the driver forward in the cab of a bus, for instance, can effect by remote control the shifting of the transmission located in the engine compartment at the very rear of the bus. This system includes feedback transmission position indicating means for the cab.

2. Description of the Prior Art

In the prior art, there are disclosures of a number of shifters used on busses, for instance, by which the driver up forward can shift the transmission at the rear of the bus. Often this is accompanied by means of a rod or flexible cable operable from the driver's cab, the rod or cable extending rearwardly to the engine compartment. A drawback of such prior devices has been that after considerable time and service, parts have rusted or deteriorated to the extent that the remote control is no longer operable. This has meant the re-installation in the bus of new parts, which installation is a great undertaking in view of the fact that the mechanical equipment described above has run the length of the vehicle. It should be noted that because busses are built to last over a period of, say, twenty years, the breakdown of prior art remote shifting devices has been a very considerable factor in the maintenance of such a vehicle.

SUMMARY OF THE INVENTION

Under the present invention, equipment adjacent the steering wheel of the bus preferably includes a bank of primary switches, each having an indicator light, and an electric cable extending rearwardly from the switches to a secondary switch arrangement in the engine compartment at the rear of the bus. This secondary switch arrangement includes means to activate selectively a pair of solenoids coupled to pneumatic chambers adapted to drive a connecting rod to shift the transmission. The secondary switch arrangement also includes switch means for the lights, which are connected to the lights up forward by the primary switches. By virtue of this structure, the driver, upon closing his primary switch, after a short interval knows by the illumination of the associated indicator light that his desired transmission shift has been accomplished. He can then confidently proceed to activate the engine.

BRIEF DESCRIPTION OF THE DRAWINGS

Other features and objects of the invention will be apparent from a reading of the following specification and a study of the attached drawings, all of which disclose a non-limiting embodiment of the invention. In the drawings:

FIG. 1 is a sectional view on line 1—1 of FIG. 2 of a pneumatic motor assembly comprising part of a system embodying the invention. The FIGURE also shows the related solenoids;

FIG. 2 is a sectional view taken on the line 2—2 of FIG. 1 and showing the transmission shifter shaft and other parts in fragmentary fashion;

DESCRIPTION OF THE PREFERRED EMBODIMENT

Figure 3:
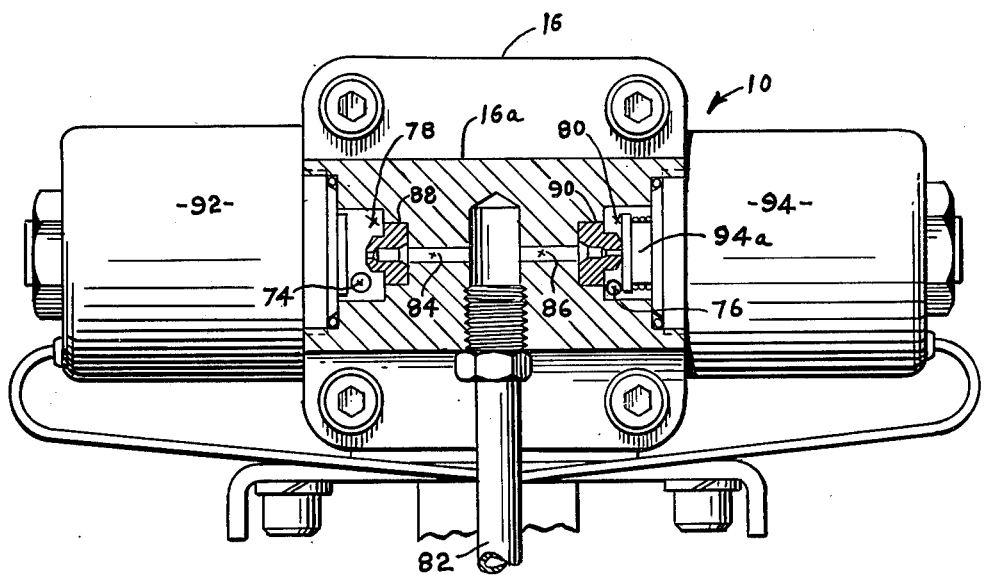
FIG. 3 is a sectional view taken on the line 3—3 of FIG. 2.

Referring more specifically to the drawings, a drive mechanism embodying the invention is shown in section in FIG. 2 and generally designated 10. It is attached to the transmission shaft TS and is actuated by a bank 12 of pushbutton primary switches preferably of the well-known type in which when one button is pressed, it completes a circuit and stays in until a second button is pressed whereupon the first button pops out opening the first switch. Preferably, the buttons are at least translucent and have mounted thereadjacent paired indicator lights so that when a button is pressed, a light will come on in the button indicating that the shift has been made to the position selected by depressing that button.

More specifically, the drive mechanism 10 comprises a housing 14 including the front and rear walls 16 and 18 between which is sandwiched housing block 20. The block is formed with a large central opening 22 which becomes the housing cavity. The rear wall 18 is apertured preferably to form an opening concentric with the cavity 22 and the aperture receives a bushing 24. The front wall 16 similarly has a bore aligned with the opening in wall 18 and receives bushing 26 in alignment with bushing 24.

An operating shaft 28 is journalled for rotation in the two bushings 24, 26 and operatively engages at its outer end the transmission shifter TS, the coupling 30 being shown (FIG. 2) schematically.

Figure 4:
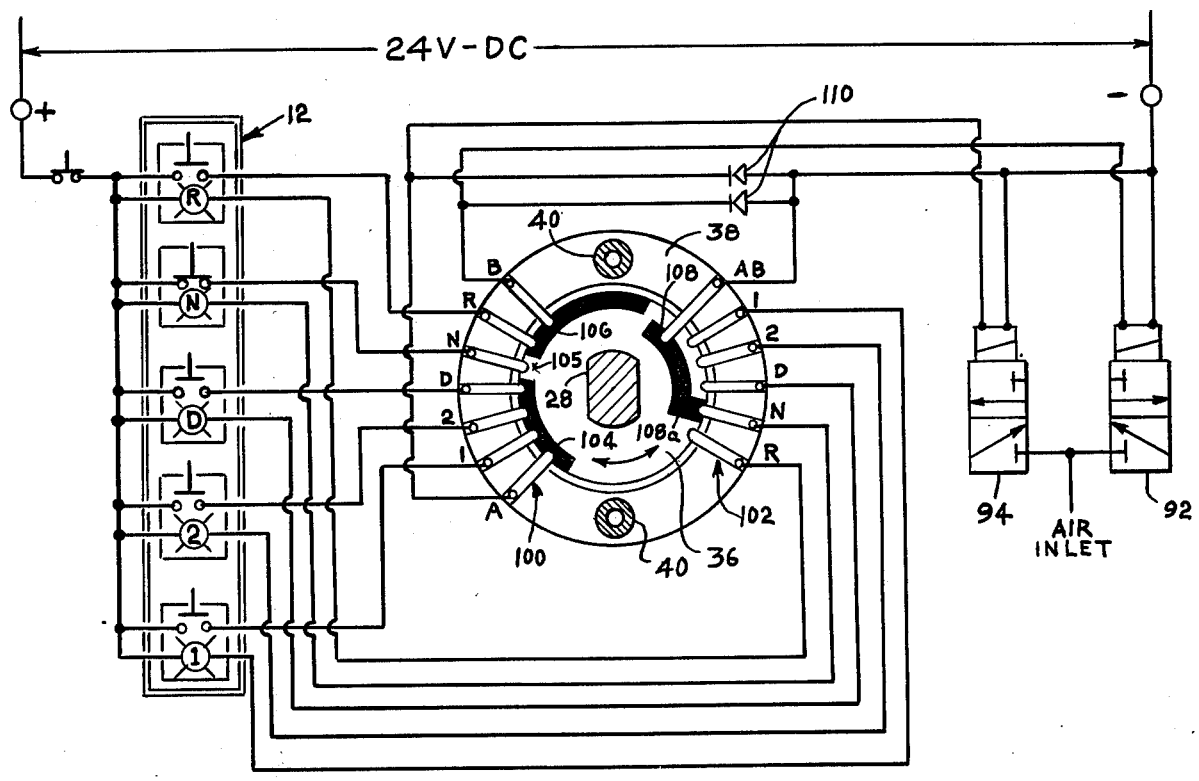
FIG. 4 is a schematic view showing the electric circuitry involved as well as a detail of the secondary switch means in an embodiment of the invention. It is partially a sectional view on line 4—4 of FIG. 2.

As shown in FIGS. 1, 2, and 4, the shaft 28 is flattened as at 28a. Press-fitted onto the shaft in the flattened area 28a is the crank 32 which carries an arm suitably apertured to receive the cross pin 34. Outward of the wall 18, the shaft 28 fixedly mounts the center disc 36 of an electric switch. Surrounding the disc 36 is the switch annulus 38 which is fixedly mounted onto the wall 18 by studs 40. This is accomplished by enlarged shoulders 40a which clampingly hold the annulus 38 in place against the spacers 42. A switch cover 44 is mounted on the housing by bolts 46 which engage in threaded openings on the studs 40.

THE PNEUMATIC SYSTEM

The drive pin 34 is driven by a pneumatic motor arrangement as shown in FIG. 1. The housing block 20 is formed at its opposite ends with cylindrical projections 48 and 50. These projections are concentrically bored to define cylindrical cavities 52 and 54, respectively. Extending through the block 20 on the axis of the cavities 52 and 54 are aligned passageways 56a and 56b for a connectiong rod 58. The connecting rod 58 is crossdrilled intermediate its ends to receive the drive pin 34.

As shown, the opposite ends of the connecting rod 58 are threaded internally and threadedly receive the respective stems of pistons 60 and 62 which are appropriately formed with peripheral channels to receive "O" rings, sealing them against the respective walls of the chambers 52 and 54.

Defined in the chambers 52 and 54 respectively and inwardly of the pistons 60 and 62 are hydraulic damping chambers 52a and 54a, respectively. These chambers are connected through a passage 63 in the tubular connecting rod 58 and through passages in the respective pistons 60 and 62 so that as the piston connecting rod piston 60, 58, 62 moves from one side of its travel to the other, there is a flow of fluid through the connecting rod as the chambers 52a and 54a respectively enlarge or reduce in size.

Intermediate the passage 63 in the ends of the connecting rod 58 is a restriction 64 which restricts the flow of hyraulic fluid in the two chambers thus providing a damping effect as the piston connecting rod assembly is moved.

Opposite cylinder cavities 52 and 54 are respectively closed by sealed end plates 66 and 68 held in place against the appropriate shoulders in the cavity by "C"-shaped retaining rings 70 and 72, respectively.

The outward or pneumatic ends of the cylinders 52 and 54 are connected by passageways 74 and 76 respectively to solenoid chambers 78 and 80.

The forward end of the wall 16 is provided with an enlargement 16a to which is connected an air pressure supply inlet tube 82, as shown. The inlet branches into passages 84 and 86 which extend to the central opening of respective solenoid valve seats 88 and 90. Working against the seats are the respective armatures of the solenoids 92 and 94. As shown in FIG. 3, the armature 94a of the solenoid 94 on deactivation thereof engages the seat 90 closing off the air pressure to the cylinder 54 and at the same time by means not shown, vents passage 76 to atmosphere. Thus, the arrangement of solenoid valve and related passages is comparable to that shown in FIG. 3 of U.S. Pat. No. 2,614,584 which issued Oct. 21, 1952 to G. A. Goepfrich.

As a result of the structure shown, the activation of the solenoid 92 will pressurize the chamber 52 as air moving in from the inlet 82 through passage 84, seat 88, chamber 78, and passage 74 fills up the chamber. This causes the piston-connecting-rod assembly 60, 58, 62 to move rightwardly as shown in FIG. 1, it being understood that with the solenoid 94 de-energized, chamber 54 is vented to the atmosphere.

The movement of the piston-connecting-rod assembly to the right continues as long as the chamber 52 is of pressure greater than atmosphere.

By the same token, de-energization of solenoid 92 and activation of the solenoid 94 causes the armature to raise from seat 90 so that air may flow in through inlet 82, passage 86, seat 90, chamber 80, and passage 76 to pressurize the chamber 54. This moves the piston and connecting rod assembly leftwardly as shown in FIG. 1, it being understood that with solenoid 92 de-energized, chamber 52 is vented to the atmosphere.

The rightward or leftward movement of the piston-connecting-rod assembly causes, through linkage of pin 34, the corresponding rotation of the crank 32 and shaft 28. This rotates the disc 36 relative to the fixed annulus 38.

THE ELECTRICAL SYSTEM

As shown in FIG. 4, the electrical system centers around the secondary switch means 36, 38 located back in the transmission compartment of the vehicle. These are connected, as shown in FIG. 4, to the primary switches generally designated 12 in the driver's cab.

As shown, the fixed annulus 38 or stator of the rotary switch comprises radially inwardly extending contact fingers which may be grouped, as viewed in FIG. 1, as a leftward or first or one group 100 and a right-ward or second or other group 102. The leftward group 100 comprises the secondary switches for controlling the movement of the transmission shifter.

The rightward group of contacts 102 are for the purpose of controlling the indicator lights paired with the respective primary switches 12 up forward.

Cooperating with the contacts 100 are a pair of spaced arcuate conductive strips 104, 106 disposed at the same radius adjacent the periphery of the disc 36. As shown, a space 105 is disposed between the two strips 104, 106, the space being slightly larger than one of the contacts of the group 100. Each of the contacts in both the groups 100 and 102 are preferably radially disposed as stated, and their inward ends contact the disc with a slight contact pressure.

As shown in FIG. 4, the contacts of the first group 100 number seven. They are labelled 100 generally in FIG. 4 and are specifically 100-A, 100-1, 100-2, 100-D, 100-N, 100-R and 100-B. However, because of shortage of space on the drawing only the suffix (after 100-) appears by the contact. The two outward contacts labelled A and B connect respectively to solenoids 92 and 94. Invariably, contact A engages strip 104 while contact B invariably engages strip 106. The intermediate contacts connect through means as shown to corresponding switch buttons reverse R, neutral N, drive D, second gear 2, first gear 1, in the primary switch means 12. As a result of the contact, structure 100 and the arcuate contact strips and spaces 104, 105, 106 together with the connecting of the primary switches in the group 12 to one side of the battery and the other side of the solenoids 92, 94 to the other side of the vehicle battery, there is achieved through the buttons in group 12, the desired rotary corresponding movement of the shaft 28.

In operation, as shown, the space 105 underlies the contact N or neutral. If it is now desired to put the vehicle in reverse gear, the primary button R is depressed, closing that switch. This connects the positive side of the battery as shown through the switch R to the contact R of secondary switch group 100 activating the strip 106 and causing current to flow through the contact B to the solenoid 92 which is also connected to the battery. This activates the solenoid 92 closing the vent to chamber 52 and pressurizing chamber 52 causing a rightward movement in the piston-connecting-rod assembly 60, 58, 62 and a consequent counterclockwise movement of the disc 36. Movement continues until the space 105 underlies the contact R on the annulus 38 breaking the circuit and de-activating the solenoid 92. Both solenoids thus de-activated, both chambers 52 an 54 are vented to atmosphere and there is consequently a cessation of movement.

If it is now desired to put the bus in second gear, the button 2 of the primary switch group 12 is depressed, connecting the contact 2 of group 100 through switch 2 to the positive side of the battery. This causes the current to flow through the contact labelled A of the secondary group 100 to activate the solenoid 94, the other side of which is connected to the negative side of the vehicle battery. Activation of solenoid 94 causes the closing of the vent of chamber 54 and the pressurizing thereof to drive the piston-connecting-rod assembly 60, 58, 62 leftwardly. This causes a counterclockwise rotation of the disc 36 which will continue until the space 105 between the arcuate patches 104 and 106 underlies the contact 2 of group 100. Because of the break in the circuit which is occasioned by this interruption, solenoid 94 is de-energized and the chamber 54 is vented to atmosphere. This causes the piston-connecting-rod assembly 60, 58, 62 to stop in the second gear position.

As the piston-connecting-rod assembly 60, 58, 62 moves rightwardly or leftwardly, the hydraulic fluid in the chambers 52a and 54a is moved through passage 63 in the connecting rod itself. The restriction 64 serves to damp this movement so that the danger of the movement being so quick as to ride past the interruption 105 between the arcuate strips 104 and 106 is eliminated.

INDICATOR SYSTEM

As explained, the group of contacts 102 on the rightward side of the fixed annulus 38 control the indicator lights which are paired with the remote switches in primary group 12. In this connection, it would be noted that the positive side of the battery is connected to one side of each of the indicator lights R, N, D, 2 and 1, and the other side of these lights are connected respectively to corresponding contacts R, N, D, 2, 1 in the second or other group of contacts 102.

An adjacent contact on line contact connecting means AB, preferably longer than other contacts in the group 102, invariably contacts an arcuate strip 108 inward from the inwardmost portions of the other contacts in group 102. Strip 108 is formed with an outward extension or patch 108a which, in the version shown, is diametrically opposed to the gap 105 between the conductive patches 104 and 106. It is also to be noted that the contacts in the second or other group 102, that is, contacts R, N, D, 2, 1, are diametrically opposed in position to the corresponding contacts R, N, D, 2, 1 of the control switch side in the first or one group 100.

The contact AB is connected to the negative side of the vehicle battery. As a result, as the various other contacts in the group 102 engage the activated strip 108a as the disc 36 rotates, the lights adjacent switches 12 light to indicate the rotary position of the disc 36 which is tied to the position of the shaft 28 and in turn to the positio of shaft TS. When, therefore, as described, the transmission is shifted from neutral— as shown in FIG. 4— to reverse, as described, the strip extension or patch, 108a will, because of the clockwise rotary movement of the disc 36, move down to engage the contact R in the second group 102. Subsequently, as described, when the shaft 28 is moved from the reverse position to second gear, as the shaft 28 and therefore disc 36 move counterclockwise, the extension or patch 108a will move up through engagement with contacts N, D, and finally 2, successively lighting the corresponding indicator lights adjacent the remote switches in group 12.

As shown in FIG. 4, diodes 110 are provided in the circuit to minimize arcing of contacts and consequent wear.

The simple structure thus described assures control from the driver's forward cab back to the transmission and is especially useful in busses and other vehicles in which the distance between the two locations is considerable. The arrangement shown is especially reliable and includes its own safeguard in that indicator lights are paired to the respective primary switch buttons to indicate the position of the transmission at any given moment.

There has thus been described an embodiment of the invention. It should be clear that the invention is not limited to the described embodiment but is capable of many modifications and variations as defined in the following claim language and equivalents thereof:

We claim:
1. A shifter operable from a remote location for shifting a vehicle transmission, the transmission having a rotary operator with the shift positions in a certain rotary sequence, the shifter comprising:
    (a) a housing means adjacent the transmission;
    (b) a first and second piston-cylinder units mounted in aligned opposed disposition in the housing means, the pistons being connected by a rigid connecting rod;
    (c) air supply means to the cylinders controlled respectively by a pair of electric solenoid-operated valves, the solenoids having two positions: an "on" position connecting the air supply to the associated cylinder, and an "off" position closing the connection and venting the associated cylinder to atmosphere;
    (d) a shaft journalled for rotation in the housing, the shaft adapted to be operatively connected to the operator and having an arm connected at a point spaced from the axis of the shaft to an intermediate portion of the connecting rod;
    (e) rotary secondary switch means mounted on the housing means and having a central rotor mounted on the shaft and an annular stator mounted about the rotor, a first group of stator contacts on the rotary switch means representing the shift positions and arranged in the same rotary sequence as the shift positions, a pair of solenoid contacts at the opposite ends of the first group of contacts respectively, a pair of spaced coarcuate conductive strips on the rotor opposite the first group, the strips always respectively contacting the solenoid contacts and other contacts in the first group, so that as the rotor turns each contact in the group contacts the strip and is closed except for one overlying the space between the strips, the open one moving in seriatum through said first group as the shaft rotates;
    (f) primary switch means including a position switch for each position of the shifter, said primary switch means being disposed in the remote location;
    (g) electrical connection means connecting one side of a source of current to each position switch of the primary switch means, connecting the separate position switches respectively to the corresponding respective contacts in the first group, connecting the solenoid contacts to the solenoids respectively so that the proper solenoid will be activated when a given position switch is closed, and connecting the other side of the solenoids to the other side of the current source, whereby closing one of the position switches activates one of the solenoid valves to the "on" condition to pressurize one of the piston cylinders and move the operator to the corresponding shift position at which the solenoid is "off" as the space between the strips underlies the corresponding position contact and both cylinders are vented to atmosphere.
2. A shifter operable from a remote location for shifting a vehicle transmission, the transmission having a rotary operator with the shift positions in a certain rotary sequence, the shifter comprising:
    (a) a housing means adjacent the transmission;
    (b) a first and second piston-cylinder units mounted in aligned opposed disposition in the housing means, the pistons being connected by a rigid connecting rod;

(c) air supply means to the cylinders controlled respectively by a pair of electric solenoid-operated valves, the solenoids having two positions: an "on" position connecting the air supply to the associated cylinder, and an "off" position closing the connection and venting the associated cylinder to atmosphere;

(d) a shaft journalled for rotation in the housing, the shaft adapted to be operatively connected to the operator and having an arm connected at a point spaced from the axis of the shaft to an intermediate portion of the connecting rod;

(e) rotary switch means mounted on the housing means and having a central rotor mounted on the shaft and an annular stator mounted about the rotor, two groups of stator contacts on the rotary switch means representing the shift positions and arranged in the same rotary sequence as the shift positions, a pair of solenoids contacts at the opposite ends of the first group of contacts respectively, a pair of spaced co-arcuate conductive strips on the rotor opposite the first group always respectively contacting the solenoid contacts and other contacts in the first group, so that as the rotor turns each contact in said one group contacts one of the two strips and is closed except for one which overlies the space between the strips, the open one moving in seriatum through said one group as the shaft rotates, a small conductive patch on the rotor cooperative with the other group of contacts and means on the rotor connecting the patch and a live contact on the stator so that each contact in the other group is open except for one, the closed one moving in seriatum through the said other group as the rotor turns, the open switch of the first group and the closed switch of the second group always corresponding to the same one of the shift positions;

(f) paired remote switch means and indicator light means for each position of the shifter; and (g) electrical connection means connecting one side of a source of current to all of the remote switch means, connecting the separate remote switch means respectively to the corresponding respective contacts in said one group, connecting the solenoid contacts to the solenoids respectively so that the proper solenoid will be activated when a given remote switch is closed, connecting the other side of the solenoids to the other side of the current source, connecting one side of the current source to each of the indicator lights, connecting the other side of the lights to the corresponding respective contacts in the said other group, and connecting the live contact to the other side of the current source, whereby closing one of the remote switches activates one of the solenoid valves to drive the connecting rod, moving the operator to the corresponding shift position at which the solenoid is "off" and both cylinders are vented to atmosphere and the pistons stop, the contact of the second group being closed at that position to light the paired indicator light.

3. A shifter as claimed in claim 2 wherein damping means dampen the movement of the connecting rod.

4. A shifter as claimed in claim 3 wherein the damping means comprises hydraulic chambers in the cylinders on the back side of the pistons, the chambers being connected by conduit means including a restriction.

5. A shifter as claimed in claim 4 wherein the conduit means is disposed in the connecting rod.

* * * * *